P. G. BEREMAND.
VEHICLE WHEEL HUB.
APPLICATION FILED MAY 8, 1916. RENEWED MAR. 15, 1918.
1,288,374.
Patented Dec. 17, 1918.
2 SHEETS—SHEET 1.
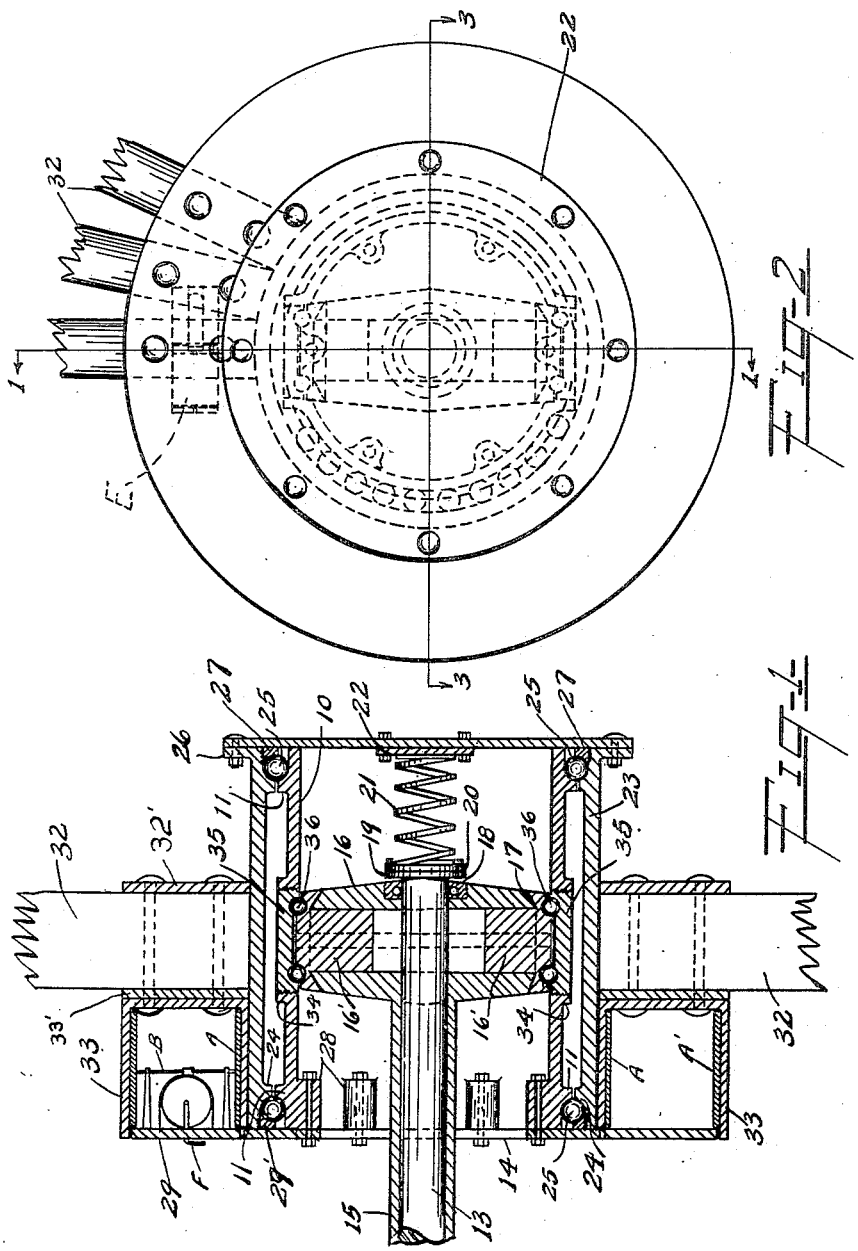
Inventor
Preston G. Beremand
Witnesses
John F. Machelski
Frank C. Searman
Edward R. Monroe.
Attorney P. G. BEREMAND.
VEHICLE WHEEL HUB.
APPLICATION FILED MAY 8, 1916. RENEWED MAR. 15, 1918.
1,288,374.
Patented Dec. 17, 1918.
2 SHEETS—SHEET 2.
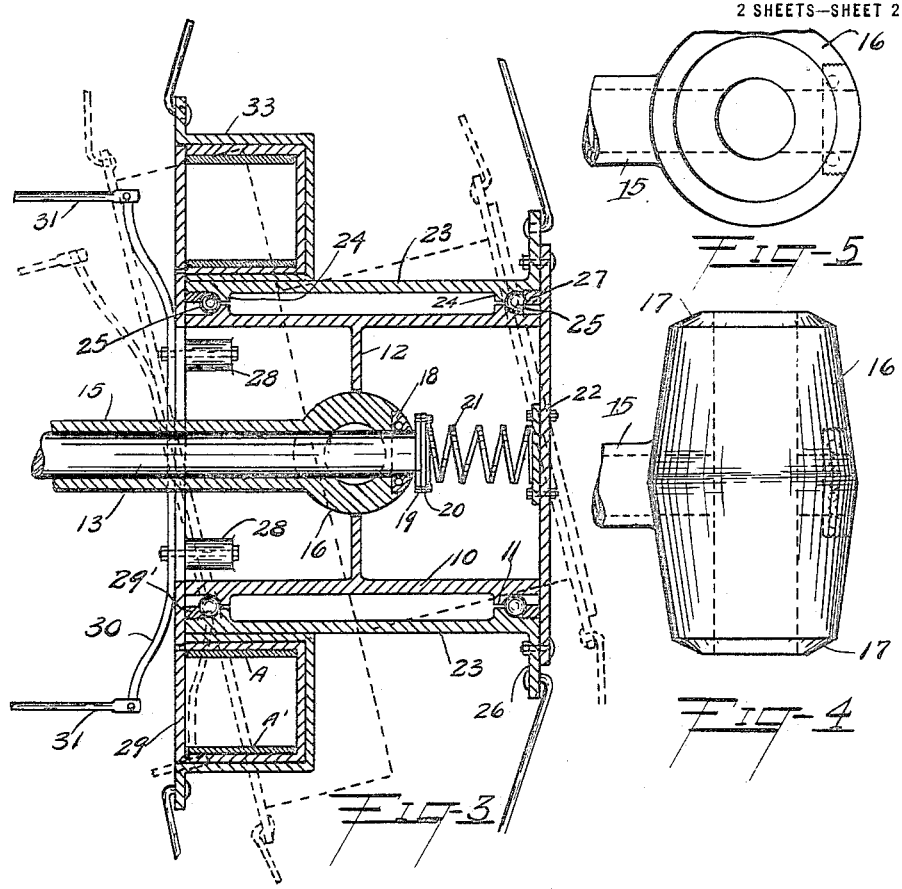
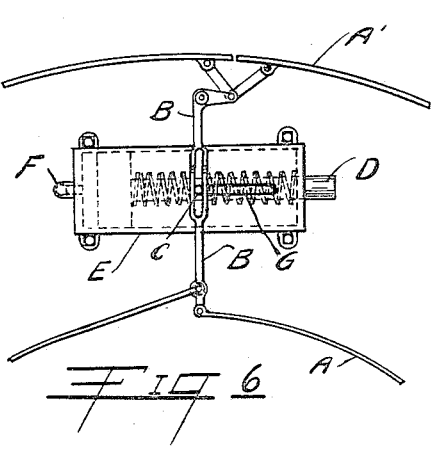
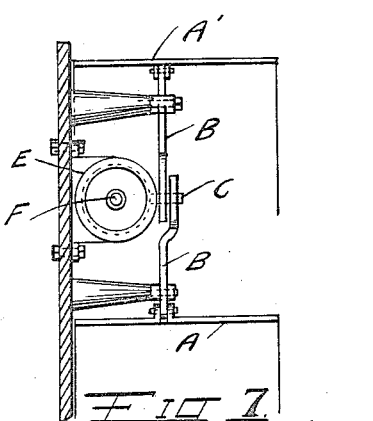
Witnesses
John F. Machelski
Frank C. Farman
Inventor
Preston G. Beremand
Edward R. Monroe.
Attorney

UNITED STATES PATENT OFFICE.

PRESTON G. BEREMAND, OF BAY CITY, MICHIGAN.

VEHICLE-WHEEL HUB.

1,288,374.  Specification of Letters Patent.  Patented Dec. 17, 1918.

Application filed May 8, 1916, Serial No. 96,164. Renewed March 15, 1918. Serial No. 222,737.

*To all whom it may concern:*

Be it known that I, PRESTON G. BEREMAND, a citizen of the United States, residing at Bay City, in the county of Bay and State of Michigan, have invented certain new and useful Improvements in Vehicle-Wheel Hubs, of which the following is a specification.

This invention relates to an improvement in vehicle wheel hubs.

The primary object of the invention is to provide a hub construction for a driven wheel which will have a stationary rigid support for the revolving elements, the stationary support taking the load in a line directly at right angles to the driving shaft on which it is mounted and at the exact center of the hub.

Another object of the invention is to provide a compact structure in which dust and other foreign matter is excluded from the working parts and in which friction is reduced to a minimum.

A still further object is to provide a structure which is adapted for use with wooden or wire wheels and to which a fluid actuating brake may be conveniently applied.

In the drawing.

Figure 1 is a section taken on the line 1—1 of Fig. 2 looking in the direction of the arrows, Fig. 2 is an end elevation, Fig. 3 is a section taken on the line 3—3 of Fig. 2 looking in the direction of the arrows, Fig. 4 is a detail view of the stationary supporting member which is arranged within the hub casing, Fig. 5 is an end elevation of said member, Fig. 6 is a detail view of the brake actuating mechanism and Fig. 7 is an end elevation of said brake actuating mechanism.

In the drawings 10 designates a cylindrical, open ended casing formed exteriorly, adjacent each of its ends with an annular rib 11. Arranged interiorly of the member 10 at its center are the inwardly directed plates 12, said plates extending approximately one quarter of the diameter of the member 10.

A shaft 13 extends through the open end 14 of the member 10, said shaft being driven through any suitable transmission (not shown). Surrounding the shaft 13 is a sleeve 15. Mounted on the shaft 13 in the exact center of the member 10 and interposed between the plates 12 is a substantially cylindrical supporting member 16. This member tapers from its center toward its ends which are beveled as at 17, and is received between the plates 12, which are cut to snugly engage the same, whereby dust or other foreign matter entering through the open end of the member 10 will be excluded from that portion of the member 10 located intermediate its closed end and the plates 12.

The member 16 at one side is cut away and supports a bearing 18 through which the shaft 13 passes. This member is also open at both ends to receive the bearings 16', the function of which will be hereinafter described. Secured to the end of the shaft 13 is a flange 19 which is bolted, or otherwise secured to a second flange 20. Secured to the flange 20 is a coiled spring 21, the terminal of said spring remote from the flange, being secured to a plate 22 which forms a closure for one end of the member 10 but which is rotatably independent of said member.

Surrounding the member 10 is a sleeve 23 formed on its inner face adjacent each of its ends with an annular rib 24 corresponding to the ribs 11 of the member 10, the ribs 11 and 24 coacting to provide one wall of a ball race in which are mounted balls 25. The sleeve 23 is provided with a flange 26 to which is bolted the plate 22. A ring 27 is interposed between the plate 22 and the balls 25 forming the other wall of the ball race at this end of the hub casing.

The member 10 on its inner wall adjacent its open end is provided with a series of lugs 28 to which is bolted an annular plate 29. To this plate 29 is secured a steering knuckle 30 operated through the medium of the radius rods 31. A ring 29' is interposed between this plate and the adjacent ribs of the members 10 and 23, forming the other half of the ball race at this side of the hub.

In the form shown in Fig. 1, the hub is equipped with the ordinary type of wooden spokes 32, while in the form illustrated in Fig. 3, wire spokes are shown as attached to the driven element of the hub. In the structure shown in Fig. 1, the spokes are carried on the outer rotating sleeve 23 between the plates 32', bolts or other securing devices passing through the spokes and plates and the side wall 33' of a brake casing 33.

This casing is substantially U-shaped in cross section and houses the expanding brake shoes A and A'. These shoes are expanded through the medium of links B which are mounted on the stud C carried by the piston D which is mounted in the air cylinder E. Air is admitted to said cylinder through the tube F operating against the action of the coiled spring G to expand the brake sections, said springs normally holding said sections contracted.

The member 10 at diametrically opposite points is provided with apertures and surrounding said apertures are threaded bosses 34 which support bearing plugs 35. The inner faces of said plugs are grooved to provide a ball race, balls 36 being arranged with the races thus formed. The cylindrical supporting member 16 is disposed with its beveled ends in alinement with the bearings 35, the balls 36 being interposed between said bearings, and the bearings which are carried in the open ends of the member 16. This construction permits the entire hub structure to rotate about the stationary member 16 when the radius rods are reciprocated.

In operation, the shaft 13 is rotated in a manner as before stated, the same rotating in the bearing 18 and imparting rotary movement to the plate 22, through the medium of the spring 21. While a spring has been illustrated as the means for flexibly connecting the driving shaft with the driven element of the hub, a universal joint or any other form of flexible connection may be employed.

As the plate 22 is rotated through the medium of the spring 21, the same will cause the outer sleeve 23, to which it is secured and on which the spokes are mounted, to rotate, thus driving the vehicle. When the radius rods are reciprocated to actuate the steering knuckle 30, the inner cylindrical member 10 and the entire structure supported thereon will rotate with the stationary member 16 as an axis. Particular attention is directed to the fact that this member is arranged centrally of the hub and thus the load is evenly distributed to the wheel, which is not the case in instances where a supporting structure is arranged at one side of the hub. Attention is also directed to the fact that the plates 12 form effectual dust guards preventing foreign matter from entering the housing for the flexible connection.

It will be noted that the entire structure is such as may be easily and economically manufactured and that the various elements which constitute the rotatable and non-rotatable elements may be easily assembled. While the inner cylindrical member 10 is described in the specification as a stationary member, it will be understood that the same participates in the movement of the hub as a whole, when the wheel is steered, the same however, remaining stationary as the wheel rotates and forming through the medium of the member 16 an effectual support for the rotating structure in which the load is evenly distributed, regardless of the position of the hub with respect to the driving shaft.

What is claimed is:—

1. A vehicle wheel hub structure, comprising a casing, a drive shaft, a vertically elongated drive shaft support mounted within the casing, means for turning the casing about the drive shaft support, a wheel member mounted upon the casing, and plates disposed at opposite sides of the drive shaft support and extending from the sides thereof to the contiguous walls of the casing to exclude foreign matter from an end portion of the casing.

2. A vehicle hub structure, comprising a casing, a drive shaft, a cylindrical drive shaft support disposed within the casing, means for turning the casing about the drive shaft support, a wheel member mounted upon the casing, and plates extending inward from opposite sides of the casing and touching the drive shaft support at their inner edges at diametrically opposite points.

3. In a vehicle wheel hub, a driven shaft, a casing embracing said shaft and spaced therefrom, inwardly directed plates arranged interiorly of said casing, a substantially cylindrical member supported on the shaft and engaged by said plates, bearings arranged at the terminals of said member and interposed between the same and the casing, annular ribs arranged exteriorly of the casing, a sleeve embracing the casing, said sleeve being formed interiorly with annular ribs corresponding to the ribs of the casing, balls interposed between the sleeve and the casing, a plate carried by the sleeve and constituting a closure for one end of the casing, a coiled spring having one of its terminals connected to said shaft and the other to said plate, whereby rotation of the shaft is transmitted to the sleeve, a plate supported by the casing at its end remote from the first mentioned plate and means arranged on said plate for moving the casing and the structure supported thereby in a plane at right angles to the shaft.

In testimony whereof I affix my signature.

PRESTON G. BEREMAND.